(12) United States Patent
Gong et al.

(10) Patent No.: US 9,626,214 B2
(45) Date of Patent: Apr. 18, 2017

(54) ESTABLISHING REDUNDANT CONNECTIONS FOR VIRTUAL MACHINE

(71) Applicant: International Business Machines Corporation, Armonk, NY (US)

(72) Inventors: Yi Ping Gong, Beijing (CN); Yan Huang, Beijing (CN); Cheng Li Wang, Beijing (CN); Jeffrey Yang, Beijing (CN); Yue Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/657,901

(22) Filed: Mar. 13, 2015

(65) Prior Publication Data

US 2015/0261562 A1    Sep. 17, 2015

(30) Foreign Application Priority Data

Mar. 14, 2014 (CN) .......................... 2014 1 0095303

(51) Int. Cl.
*G06F 9/455* (2006.01)
*G06F 9/46* (2006.01)
(Continued)

(52) U.S. Cl.
CPC .......... *G06F 9/45558* (2013.01); *G06F 9/455* (2013.01); *G06F 9/45533* (2013.01); *G06F 9/50* (2013.01); *G06F 9/5005* (2013.01); *G06F 9/5011* (2013.01); *G06F 9/5022* (2013.01); *G06F 9/5061* (2013.01); *G06F 9/5072* (2013.01); *G06F 9/5077* (2013.01); *G06F 9/5083* (2013.01); *H04L 67/1097* (2013.01); *G06F 2009/4557* (2013.01); *G06F 2009/45579* (2013.01); *G06F 2009/45595* (2013.01); *H04L 67/1095* (2013.01)

(58) Field of Classification Search
None
See application file for complete search history.

(56) References Cited

U.S. PATENT DOCUMENTS 6,088,330 A * 7/2000 Bruck ................. G06F 11/1076
                                                          370/228
7,760,626 B2   7/2010 Malpani et al.
(Continued)

OTHER PUBLICATIONS

Jhawar et al, "Fault Tolerance Management in IaaS clouds", 2012, IEEE, pp. 1-6.*

(Continued)

*Primary Examiner* — Charles Swift
(74) *Attorney, Agent, or Firm* — Yee & Associates, P.C.; Richard A. Wilhelm

(57) ABSTRACT

A method for establishing redundant connections for a virtual machine, which comprises: obtaining a plurality of storage nodes storing a same virtual machine image of the virtual machine; determining at least two storage nodes from the plurality of storage nodes, so that connections between a compute node provisioning the virtual machine and each of the at least two storage nodes have minimum correlation; and establishing connections between the compute node and the at least two storage nodes respectively. The present invention further discloses the corresponding apparatus.

18 Claims, 6 Drawing Sheets

(51) Int. Cl.
*G06F 15/173* (2006.01)
*G06F 15/16* (2006.01)
*G06F 9/50* (2006.01)
*H04L 29/08* (2006.01)

(56) References Cited

U.S. PATENT DOCUMENTS

| | | | |
|---|---|---|---|
| 8,086,840 B2 | 12/2011 | Cheston et al. | |
| 8,782,008 B1* | 7/2014 | Xing | G06F 17/30575 707/660 |
| 2003/0182593 A1* | 9/2003 | Emberty | H04L 1/22 714/5.11 |
| 2005/0278583 A1* | 12/2005 | Lennert | G06F 11/1461 714/43 |
| 2007/0233983 A1* | 10/2007 | Tanaka | G06F 3/0622 711/163 |
| 2008/0147821 A1* | 6/2008 | Dietrich | G06F 17/30206 709/216 |
| 2010/0191946 A1* | 7/2010 | Cheston | G06F 3/06 713/2 |
| 2010/0274765 A1* | 10/2010 | Murphy | G06F 11/1451 707/652 |
| 2010/0325473 A1* | 12/2010 | Agneeswaran | G06F 11/2041 714/4.1 |
| 2012/0047394 A1* | 2/2012 | Jain | G06F 11/2028 714/4.11 |
| 2012/0166644 A1* | 6/2012 | Liu | G06F 9/4856 709/226 |
| 2013/0013766 A1 | 1/2013 | Britsch et al. | |
| 2013/0111262 A1* | 5/2013 | Taylor | G06F 11/2005 714/4.11 |
| 2013/0132967 A1* | 5/2013 | Soundararajan | G06F 9/5066 718/104 |
| 2013/0227558 A1* | 8/2013 | Du | G06F 9/5077 718/1 |
| 2013/0246857 A1* | 9/2013 | Minamiura | G06F 11/267 714/42 |
| 2014/0032727 A1* | 1/2014 | Kano | H04L 49/552 709/223 |
| 2014/0095925 A1* | 4/2014 | Wilson | G06F 11/1425 714/4.12 |
| 2014/0169159 A1* | 6/2014 | Liu | H04L 41/0659 370/228 |
| 2014/0181572 A1* | 6/2014 | Bradfield | G06F 11/20 714/4.11 |
| 2014/0189432 A1* | 7/2014 | Gokhale | G06F 17/30289 714/41 |
| 2014/0337664 A1* | 11/2014 | Gokhale | G06F 11/1464 714/6.3 |
| 2015/0095597 A1* | 4/2015 | Ayanam | G06F 3/065 711/162 |

OTHER PUBLICATIONS

Zhao et al, "Application-Managed Databased Replication on Virtualized Cloud Environment", 2012. IEEE, pp. 127-134.*
Steadman, "The Architectural Advantages of HP LeftHand SANs," Hewlett-Packard Development Company, 4AA3-0365ENW, Dec. 2009, 28 pages.

* cited by examiner

ESTABLISHING REDUNDANT CONNECTIONS FOR VIRTUAL MACHINE

CROSS-REFERENCE TO RELATED APPLICATION(S)

This application claims the benefit of priority to Chinese Patent Application No. 201410095303.6, filed Mar. 14, 2014, the contents of which are incorporated herein by reference.

BACKGROUND

The present invention relates to the virtualization technology, and more specifically, to a method and an apparatus for establishing redundant connections for a virtual machine.

In a distributed network such as a cloud computing network, there are generally two types of nodes, i.e. compute nodes and storage nodes. The compute node may provide computing resources necessary to provision a virtual machine, such as a CPU and memory, and the storage node can store and provide a virtual machine image. With respect to the storage node, the compute node is a client device.

When provisioning a virtual machine on a compute node, it is necessary to load the virtual machine image to complete the initial configuration of the virtual machine system. Therefore, it is necessary to establish a connection between the compute node and the storage node to transmit the virtual machine image.

In the prior art, an Internet Small Computer System Interface (iSCSI) protocol can be used to establish the connection between the compute node and the storage node. The iSCSI protocol can implement mass data package and reliable transmission between a host system (an initiator) and a storage device (a target) over an IP network.

For high availability of the virtual machine, typically, the same virtual machine image is stored on a plurality of storage nodes. The compute node can select any storage node to establish an iSCSI connection, so as to access the storage node to obtain the virtual machine image.

However, such a connection is susceptible to a network. If any node in the connection fails, the connection will be disconnected, thereby resulting in virtual machine crashes.

Furthermore, when a plurality of storage nodes that store the same virtual machine image are available, how to select the most appropriate storage node to provide the virtual machine image is also an important issue.

SUMMARY

Embodiments of the invention provide a method and an apparatus for establishing redundant connections for a virtual machine.

According to one embodiment of the present invention, there is provided a method for establishing redundant connections for a virtual machine, which comprises: obtaining a plurality of storage nodes storing a same virtual machine image of the virtual machine; determining at least two storage nodes from the plurality of storage nodes, so that connections between a compute node provisioning the virtual machine and each of the at least two storage nodes have minimum correlation; and establishing connections between the compute node and the at least two storage nodes respectively.

According to another embodiment of the present invention, there is provided an apparatus for establishing redundant connections for a virtual machine, which comprises: a node obtaining module configured to obtain a plurality of storage nodes storing a same virtual machine image of the virtual machine; a determining module configured to determine at least two storage nodes from the plurality storage nodes, so that connections between a compute node provisioning the virtual machine and each of the at least two storage nodes have minimum correlation; and a connection establishing module configured to establish connections between the compute node and the at least two storage nodes respectively.

The method and apparatus according to the embodiments of the present invention can provide redundant connections for the virtual machine provisioned on the compute node, in order to prevent a crash of the virtual machine caused by disconnection, thereby improving reliability of the connection.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
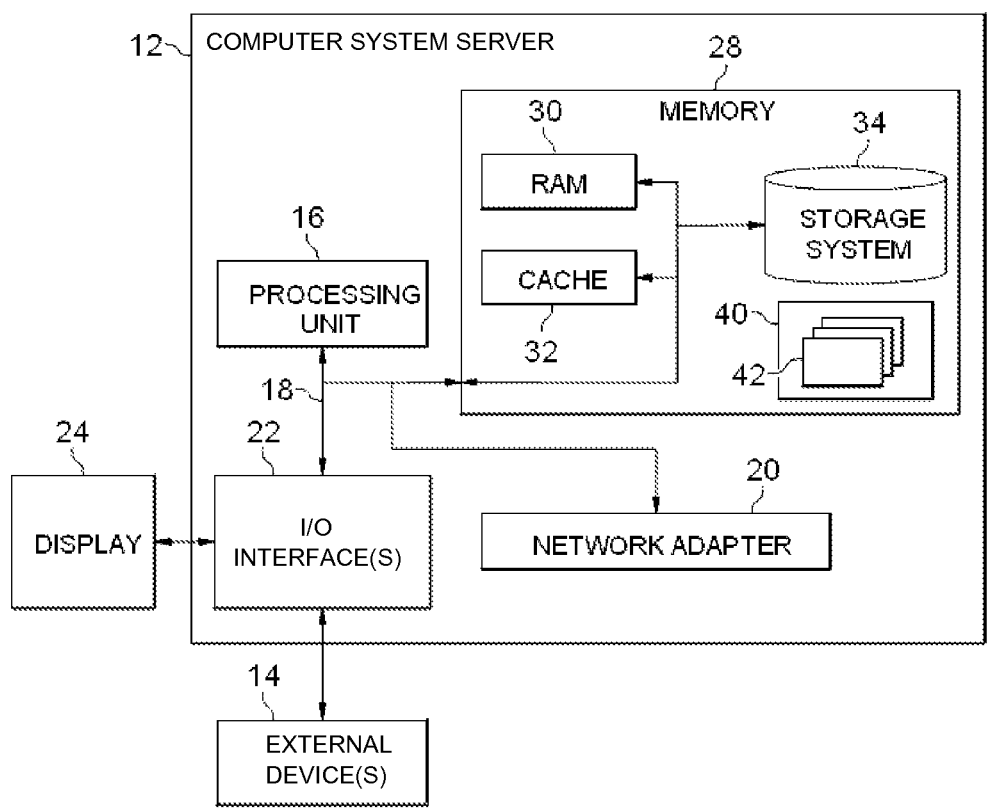
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
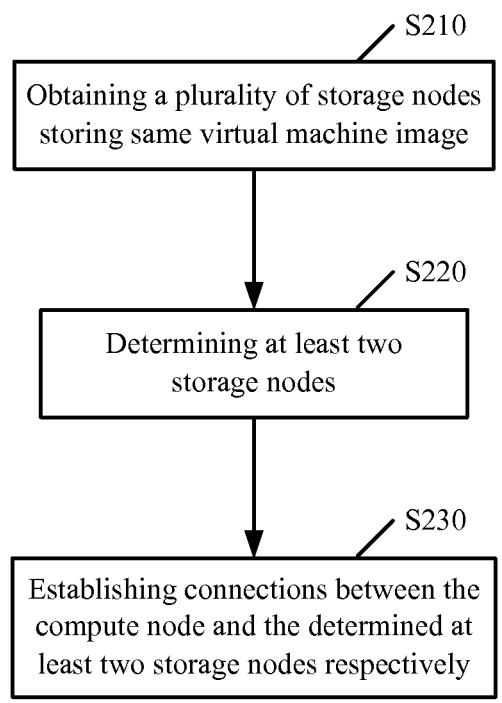
FIG. 2 is a flowchart of the method for establishing redundant connections for a virtual machine according to an embodiment of the present invention.

FIG. 2 is a flowchart of the method for establishing redundant connections for a virtual machine according to an embodiment of the present invention. This embodiment will be described in detail in conjunction with the drawings.

The method of this embodiment can be applied to a distributed network such as a cloud computing network, and can be executed by the compute node or another node independent of the compute node and the storage node in the distributed network. As mentioned before, the compute node can be used to provide computing resources required to provision the virtual machine, such as a CPU and memory. The storage node can be used to store and provide a virtual machine image of the virtual machine. In addition, the same virtual machine image used for the same virtual machine can be stored separately on a plurality of storage nodes.

As shown in FIG. 2, firstly, in step S210, a plurality of storage nodes storing the same virtual machine image of the virtual machine is obtained. In this step, a query message may be sent to the storage nodes in the distributed network, and then the storage nodes that have received the query message report which virtual machines' virtual machine images are stored therein. Thus, the plurality of storage nodes storing the same virtual machine image of the virtual machine to be provisioned on the compute node may be obtained.

Next, in step S220, at least two storage nodes are determined from the plurality of storage nodes, as target storage nodes to establish the connections with the compute node on which the virtual machine is provisioned (hereinafter referred to as "compute node"). In this embodiment, it is necessary to consider high availability and reliability of the connection to be established when selecting the target storage nodes, in order that the connections between the compute node and the determined at least two storage nodes have minimum correlation.

Figure 3:
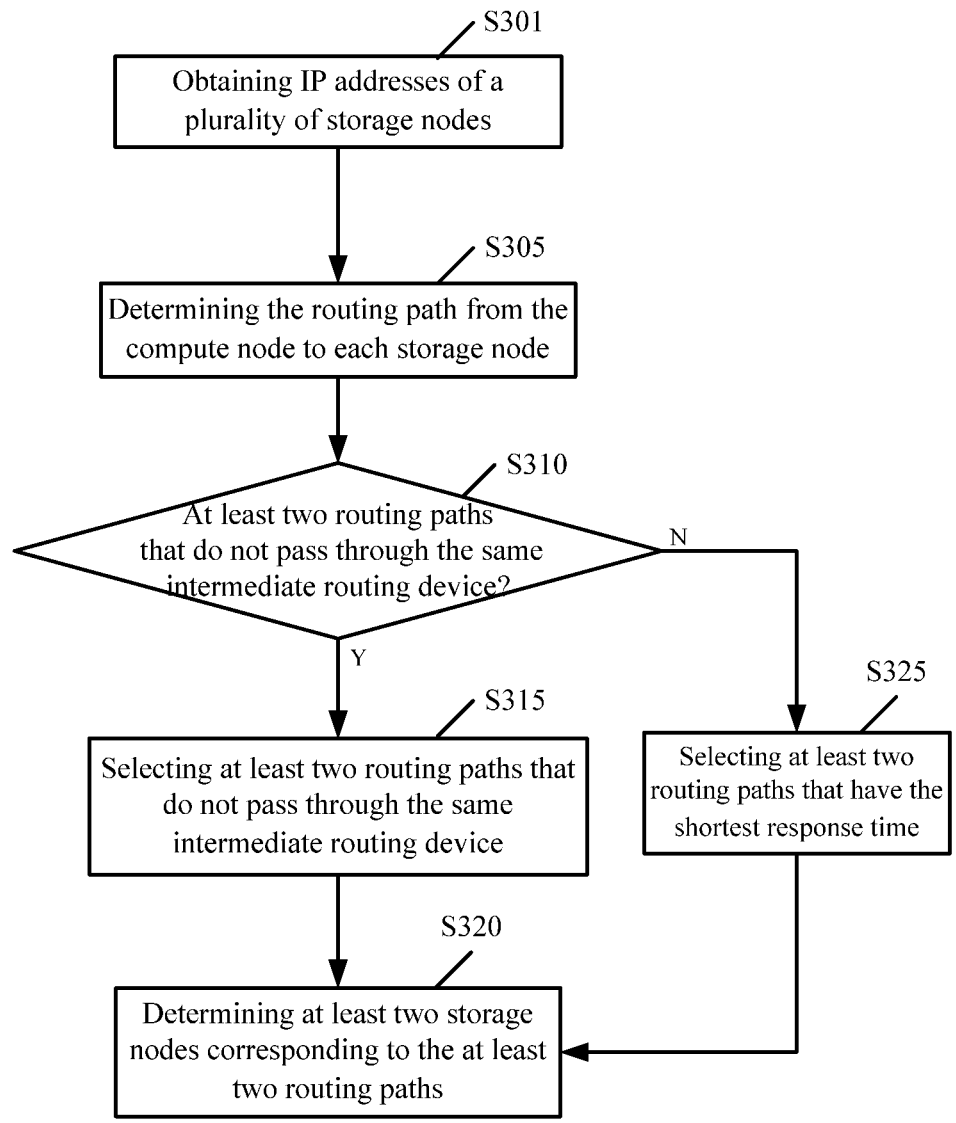
FIG. 3 is a flowchart of the step of determining the storage nodes in an embodiment shown in FIG. 2.

In one embodiment, the correlation of the at least two connections may be embodied as whether at least two routing paths from the compute node to the at least two target storage nodes pass through the same intermediate routing device. FIG. 3 is a flowchart of an embodiment for determining the target storage nodes. As shown in FIG. 3, in step S301, IP addresses of a plurality of storage nodes are obtained. When the storage node reports the stored virtual machine image, the IP address of the storage node is provided together. Thus, the IP address of the storage node can be obtained from the message from the storage node. Next, in step S305, the routing path from the compute node to each storage node may be determined based on the IP address of the storage node, in order to obtain the intermediate routing devices through which each routing path passes. Then, in step S310, it is determined whether there are at least two routing paths that do not pass through the same intermediate routing device in the determined plurality of routing paths. If there are at least two routing paths that do not pass through the same intermediate routing device ("Yes" in step S310), in step S315, the at least two routing paths that do not pass through the same intermediate routing device are selected. Next, in step S320, the at least two storage nodes corresponding to the at least two routing paths are determined as the target storage nodes. Since the routing paths from the compute node to the selected target storage nodes do not pass through the same intermediate routing device, even if any one of the connections established between the compute node and these target storage nodes is disconnected, other connections will not be, so that the high availability and redundancy reliability are ensured.

Further, in step S315, the at least two routing paths that do not pass through the same intermediate routing device and have the shortest response time may be further determined.

Moreover, in the case that there are not at least two routing paths that do not pass through the same intermediate routing device in the plurality of routing paths ("No" in step S310), the correlation of at least two connections can be embodied as the response time of the routing path. In this embodiment, the response time indicates the time interval from the time when the compute node sends a request to the time when the response from the storage node has been received. Thus, in step S318, at least two routing paths having the shortest response time may be selected from the plurality of routing paths, according to the response time of each routing path. Then, in step S320, the at least two storage nodes corresponding to the at least two routing paths are determined as target storage nodes.

In another embodiment, a network segment-location area mapping table can be pre-established, which records the correspondence between a location area identifier and a network segment of IP addresses available in the distributed network. In this case, the correlation of at least two connections may be embodied as whether at least two target storage nodes are in the same location area. The IP addresses available in the distributed network may be divided into a plurality of network segments, and each network segment may be assigned with a location area identifier. Alternatively, several network segments may be assigned with the same location area identifier. During the determination of the target storage nodes, firstly, the IP addresses of the corresponding storage nodes may be obtained from the messages from a plurality of storage nodes. According to the obtained IP addresses of the storage nodes, the network segments to which the IP addresses of the storage nodes belong may be determined. Then, the location area identifiers of the storage nodes may be obtained by looking up the network segment-location area mapping table. Then, the at least two storage nodes having different location area identifiers are determined from the plurality of storage nodes as the target storage nodes.

Returning to FIG. 2, in step S230, connections between the compute node and the at least two storage nodes that are the target storage nodes are established respectively. In this embodiment, the connection means a connection used for data transmission between the compute node and the target storage node, which is established according to an IP network-based storage protocol. The IP network-based storage protocol may be an iSCSI protocol or a Fibre Channel over Ethernet (FCoE) protocol. Thus, the connection may be either an iSCSI connection or an FCoE connection. When the iSCSI connection is established, the compute node is regarded as the initiator, and the determined storage node is regarded as the target.

It can be seen from the above description that the method for establishing redundant connections for a virtual machine according to this embodiment can establish the connections between the compute node and the at least two storage nodes storing the same virtual machine image to provide the redundant connections, and to prevent a crash of the virtual machine on the compute node caused by disconnection. Furthermore, the method of this embodiment improves high availability and redundancy reliability of the connection by preferably selecting the storage nodes located in different network segments as the target storage nodes.

Figure 4:
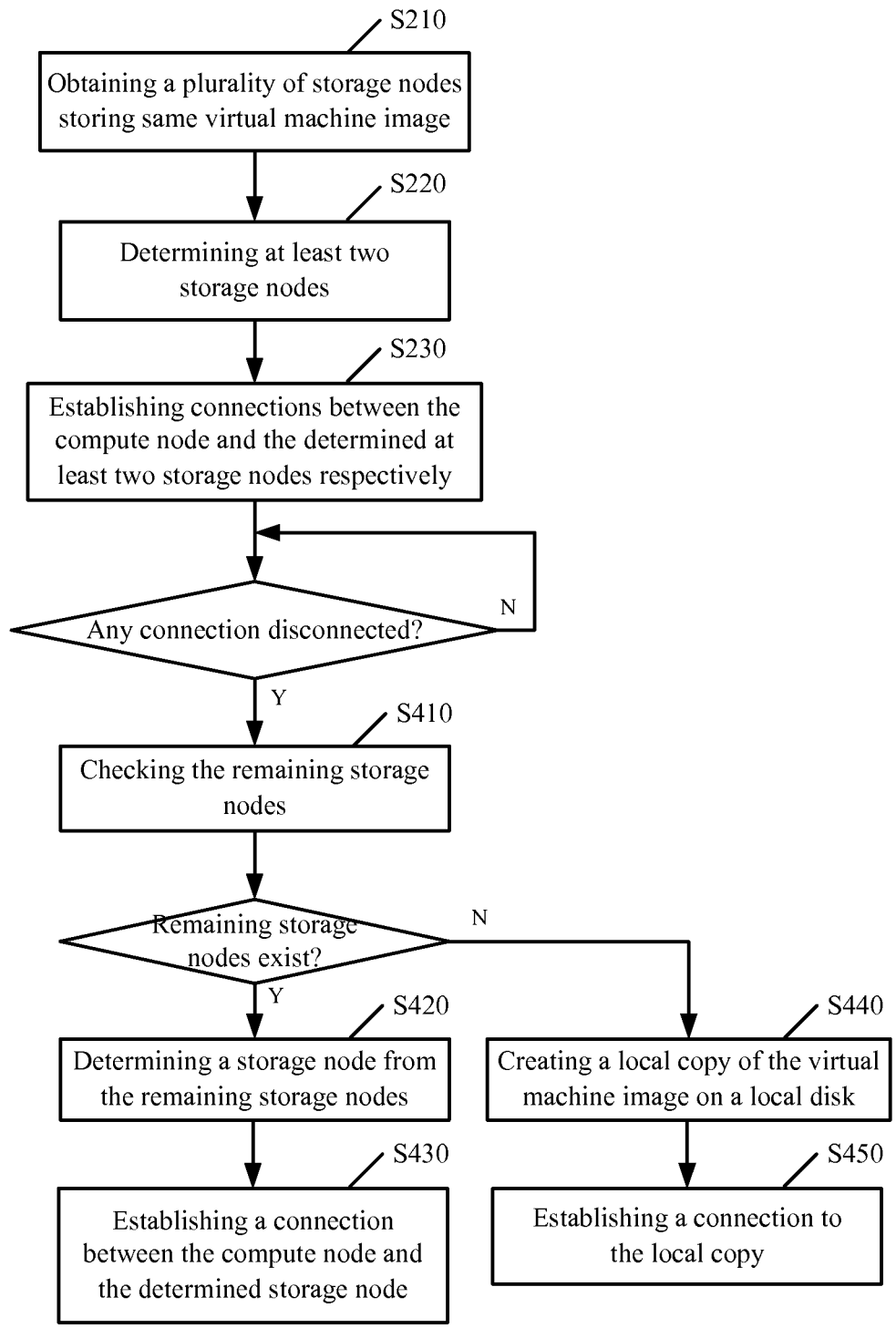
FIG. 4 is a flowchart of the method for establishing redundant connections for a virtual machine according to another embodiment of the present invention.

FIG. 4 is a flowchart of the method for establishing redundant connections for a virtual machine according to another embodiment of the present invention. This embodiment will be described in detail in conjunction with the drawing, wherein the same reference numbers are used for the same components as those in the previous embodiments, and the description thereof will be omitted appropriately.

The method of this embodiment further comprises maintaining the redundant connections, in addition to steps S210~S230 shown in FIG. 3.

As shown in FIG. 4, after the at least two connections have been established (step S230), in step S410, in response to any one of the established connections being disconnected, it is checked whether there are remaining storage nodes except the storage nodes used for the currently established connections in the plurality of storage nodes obtained in step S210.

If there are the remaining storage nodes, in step S420, a storage node is determined from the remaining storage nodes, as a new target storage node. In this step, the above-described method for determining the target storage node according to the routing path or the location area identifier may be used, or any remaining storage node may be determined as the target storage node. Then, in step S430, a new connection is established between the compute node and the determined storage node.

Further, if there is no remaining storage node, in step S440, a local copy of the virtual machine image is created on a local disk of the compute node. After the connection is established, the virtual machine image on the storage node may be transmitted to the compute node through the connection to create the local copy. Then, in step S450, based on the created local copy of the virtual machine image, a new connection to the local copy is established on the compute node. In this step, in the case that the connection is an iSCSI connection, the local disk storing the local copy of the virtual machine image may be regarded as the target, so that the iSCSI connection can be established on the compute node. Since the local disk has the higher reliability than the storage node, the connection to the local copy also has the higher reliability.

In order to save the storage of the local disk, when the virtual machine provisioned on the compute node terminates, the compute node will clear the local copy of the virtual machine image on the local disk.

Additionally, further, when there is no remaining storage node, another compute node storing the local copy of the required virtual machine image may also be obtained. In this step, the query message may be sent to other compute nodes, and then other compute nodes report which virtual machine images' copies are stored therein. This step may be executed simultaneously with the above-described step S210, i.e. the query message may be sent to the storage nodes and compute nodes in the distributed network, and then the storage nodes and the compute nodes report the virtual machine image or the copy of the virtual machine they store in response to receiving the query message. Thus, the plurality of storage nodes or compute nodes storing the required virtual machine image may be obtained. Then, a new connection between the compute node and another compute node storing the required virtual machine image may be established. If there is no other compute node storing the copy of the required virtual machine image, then the step S440 may be executed.

It can be seen from the above description that the method for establishing redundant connections for a virtual machine according to this embodiment can further maintain the connection redundancy when the established connection is disconnected, and establish a new connection in accordance with the strategy that the storage node is prior to the local disk of the compute node. In addition, in the case that there is no remaining storage node, the method of this embodiment further establish a new connection by locally creating the local copy of the virtual machine image or by using another compute node storing the copy of the required virtual machine image.

Figure 5:
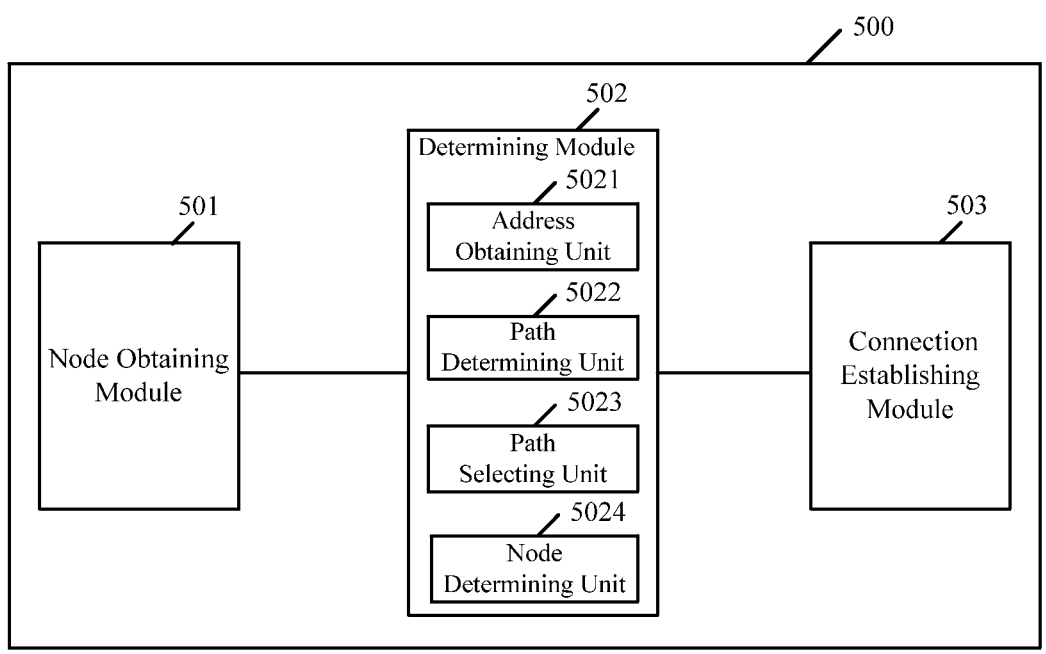
FIG. 5 is a schematic block diagram of an apparatus for establishing redundant connections for a virtual machine according to an embodiment of the present invention.

Under the same inventive concept, FIG. 5 is a schematic block diagram of the apparatus 500 for establishing redundant connections for a virtual machine according to an embodiment of the present invention. This embodiment will be described in detail in conjunction with the drawing, wherein the description of the parts that are same as those of the previous embodiment will be omitted appropriately.

As shown in FIG. 5, the apparatus 500 of this embodiment may comprise: a node obtaining module 501 which is configured to obtain a plurality of storage nodes storing the same virtual machine image of the virtual machine; a determining module 502 which is configured to determine at least two storage nodes from the plurality storage nodes obtained by the node obtaining module 501, so that the connections between the compute node provisioning the virtual machine and each of the determined at least two storage nodes have minimum correlation; and a connection establishing module 503 which is configured to establish the connections between the compute node and the at least two storage nodes determined by the determining module 502 respectively.

In the apparatus 500 according to this embodiment, firstly, the node obtaining module 501 may obtain a plurality of storage nodes which stores the required virtual machine image by sending the query message to the storage nodes in the distributed network.

Subsequently, the determining module 502 determines at least two appropriate storage nodes as the target storage nodes from the plurality of storage nodes obtained by the node obtaining module 501. When determining the target storage nodes, the minimum correlation of at least two connections between the compute node and the at least two target storage nodes will be considered.

In one embodiment, the correlation of the at least two connections may be embodied as whether at least two routing paths from the compute node to the at least two target storage nodes pass through the same intermediate routing device. In this case, in the determining module 502, an address obtaining unit 5021 obtains IP addresses of the storage nodes. As described above, when the storage node reports the virtual machine image it stores, an IP address of the storage node is provided together. Thus, the address obtaining unit 5021 may obtain the IP address of the storage node from the message from the storage node. Next, a path determining unit 5022 may determine the routing path from the compute node to each storage node, based on the IP address of each storage node, and may further determine the intermediate routing devices through which each routing path passes. Then, a path selecting unit 5023 selects at least two routing paths that do not pass through the same intermediate routing device in the determined plurality of routing paths, and a node determining unit 5024 determines the at least storage nodes corresponding to the at least routing paths, as the target storage nodes.

Further, the path selecting unit 5023 may select at least two routing paths that do not pass through the same intermediate routing device and have the shortest response time from the routing paths. Then, the node determining unit 5024 determines the at least two storage nodes corresponding to the at least two routing paths as the target storage nodes.

Moreover, in the case that there are not at least two routing paths that do not pass through the same intermediate routing device, the correlation of at least two connections can be embodied as the response time of the routing path. In this case, the path selecting unit 5023 may select at least two routing paths having the shortest response time from the plurality of routing paths. Then, the node determining unit 5024 may determine the at least two storage nodes corresponding to the at least two routing paths as the target storage nodes.

In another embodiment, in the selecting module 502, the address obtaining unit may obtain the IP addresses of the storage nodes from the messages from the storage nodes. Next, a network segment determining unit may determine, according to the IP address of the storage node, the network segment to which the IP address belongs. A location area identifier obtaining unit may obtain the location area identifiers of the storage nodes according to a pre-established network segment-location area mapping table. In this embodiment, the network segment-location area mapping table may be a table which records the correspondence between the location area identifier and the network segment of IP addresses available in the distributed network, and which may be pre-established. The IP addresses available in the distributed network may be divided into a plurality of network segments, and each network segment may be assigned with a location area identifier. Alternatively, several network segments may be assigned with the same location area identifier. In this case, the correlation of at least two connections may be embodied as whether the at least two target storage nodes are located in the same location area. Then, the node determining unit may determine the at least two storage nodes having different location area identifiers from the plurality of storage nodes, as the target storage nodes.

After the determining module 502 determines the target storage nodes, the connection establishing module 503 establishes the connections between the compute node and the determined at least two storage nodes respectively. In this embodiment, the connection may be a connection based on the iSCSI protocol, or a connection based on the FCoE protocol.

It should be noted that the device 500 of this embodiment can operationally implement the method for establishing redundant connections for a virtual machine according to the embodiments shown in FIG. 2 and FIG. 3. Furthermore, the apparatus 500 of the present embodiment may be included in the compute node or may be a standalone device.

Figure 6:
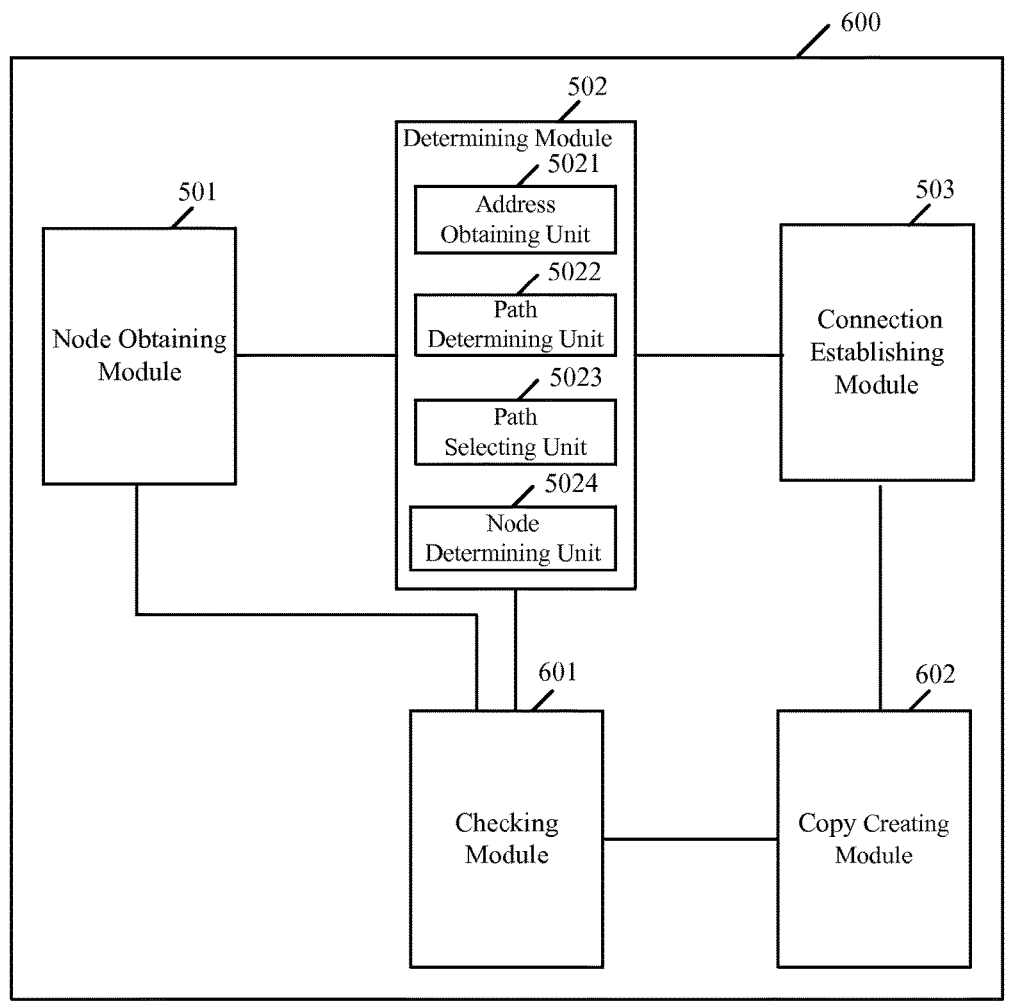
FIG. 6 is a schematic block diagram of an apparatus for establishing redundant connections for a virtual machine according to another embodiment of the present invention.

FIG. 6 is a schematic block diagram of the apparatus 600 for establishing redundant connections for a virtual machine according to another embodiment of the present invention. This embodiment will be described in detail in conjunction with the drawing, wherein the description of the parts which are same as those of the previous embodiment will be omitted appropriately.

As shown in FIG. 6, the apparatus 600 of this embodiment further comprises a checking module 601, in addition to the node obtaining module 501, the determining module 502 and the connection establishing module 503 shown in FIG. 5.

In the apparatus 600 of this embodiment, in response to any one of the connections established by the connection establishing module 503 being disconnected, the checking module 601 checks whether there are remaining storage nodes in the plurality of storage nodes obtained by the node obtaining module 501. If there are the remaining storage nodes, the determining module 502 determines a storage node from the remaining storage nodes, as a new target storage node. Then, the connection establishing module 503 establishes a connection between the compute node and the determined new storage node.

Furthermore, the apparatus 600 of this embodiment may also comprise a copy creating module 602. If there is no remaining storage node, the copy creating module 602 creates a local copy of the virtual machine image on a local disk of the compute node. Then, the connection establishing module 503 creates a new connection to the local copy on the compute node based on the local copy.

Furthermore, in the apparatus 600 of this embodiment, if there is no remaining storage node, the node obtaining module 501 may obtain another compute node storing the local copy of the required virtual machine image. When implemented, the node obtaining module 501 may simultaneously obtain other compute nodes and the storage nodes storing the copy of the required virtual machine image. Then, the connection establishing module 503 establishes a connection between the compute node and another compute node.

It should be noted that the apparatus 600 can operationally implement the method for establishing redundant connections for a virtual machine according to the embodiment shown in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing redundant connections for a virtual machine, comprising:
   obtaining a plurality of storage nodes storing a same virtual machine image of the virtual machine;
   determining at least two storage nodes from the plurality of storage nodes storing the same virtual machine image of the virtual machine so that connections between a compute node provisioning the virtual machine and each of the at least two storage nodes storing the same virtual machine image of the virtual machine have minimum correlation, wherein the determining further comprises:
      obtaining IP addresses of the plurality of storage nodes storing the same virtual machine image of the virtual machine;
      determining a plurality of routing paths from the compute node to the plurality of storage nodes storing the same virtual machine image of the virtual machine;
      selecting at least two routing paths that do not pass through a same intermediate routing device from the plurality of routing paths;
      and determining the at least two storage nodes corresponding to the at least two routing paths; and
   establishing the redundant connections for the virtual machine by establishing connections between the compute node provisioning the virtual machine and the at least two storage nodes storing the same virtual machine image of the virtual machine.

2. The method according to claim 1, wherein the determining at least two storage nodes from the plurality of storage nodes so that connections between a compute node provisioning the virtual machine and each of the at least two storage nodes have minimum correlation further comprises: selecting at least two routing paths having a shortest response time from the plurality of routing paths if there are not the at least two routing paths that do not pass through the same intermediate routing device in the plurality of routing paths; and determining the at least two storage nodes corresponding to the at least two routing paths.

3. The method according to claim 1, wherein the selecting of at least two routing paths that do not pass through the same intermediate routing device from the plurality of routing paths comprises: selecting at least two routing paths that do not pass through the same intermediate routing device and have a shortest response time.

4. The method according to claim 1, wherein the determining at least two storage nodes from the plurality of storage nodes so that connections between a compute node provisioning the virtual machine and each of the at least two storage nodes have minimum correlation further comprises:
   determining network segments to which the IP addresses of the plurality of storage nodes belong;
   obtaining location area identifiers of the plurality of storage nodes according to a pre-established network segment-location area mapping table; and
   determining at least two storage nodes having different location area identifiers from the plurality of storage nodes storing the same virtual machine image of the virtual machine.

5. The method according to claim 1, further comprising:
   checking, in response to any one of the redundant connections being disconnected, whether there are remaining storage nodes except the determined at least two storage nodes in the plurality of storage nodes storing the same virtual machine image of the virtual machine;
   determining a storage node from the remaining storage nodes; and
   establishing a connection between the compute node provisioning the virtual machine and the determined storage node.

6. The method according to claim 5, further comprising:
   creating a local copy of the virtual machine image on a local disk of the compute node provisioning the virtual machine if there is no remaining storage node in the plurality of storage nodes storing the same virtual machine image of the virtual machine; and
   establishing a connection to the local copy on the compute node provisioning the virtual machine.

7. The method according to claim 5, further comprising:
   obtaining another compute node storing a local copy of the virtual machine image at the compute node if there is no remaining storage node in the plurality of storage nodes storing the same virtual machine image of the virtual machine; and
   establishing a connection between the compute node and the another compute node storing the local copy of the virtual machine image.

8. The method according to claim 1, wherein obtaining the plurality of storage nodes storing the same virtual machine image of the virtual machine comprises:
   receiving an indication from each of the plurality of storage nodes indicating which virtual machine images are stored thereon.

9. The method according to claim 8, wherein the indication is received in a report provided by the each of the plurality of storage nodes that also includes a respective IP address for each respective one of the plurality of storage nodes storing the same virtual machine image of the virtual machine.

10. An apparatus for establishing redundant connections for a virtual machine, comprising:
- a node obtaining module configured to obtain a plurality of storage nodes storing a same virtual machine image of the virtual machine;
- a determining module configured to determine at least two storage nodes from the plurality of storage nodes storing the same virtual machine image of the virtual machine so that connections between a compute node provisioning the virtual machine and each of the at least two storage nodes storing the same virtual machine image of the virtual machine have minimum correlation, wherein the determining module comprises:
  - an address obtaining unit configured to obtain IP addresses of the plurality of storage nodes storing the same virtual machine image of the virtual machine;
  - a path determining unit configured to determine a plurality of routing paths from the compute node to the plurality of storage nodes storing the same virtual machine image of the virtual machine;
  - a path selecting unit configured to select at least two routing paths that do not pass through a same intermediate routing device from the plurality of routing paths; and
  - a node determining unit configured to determine the at least storage nodes corresponding to the at least two routing paths; and
- a connection establishing module configured to establish the redundant connections for the virtual machine by establishing connections between the compute node provisioning the virtual machine and the at least two storage nodes storing the same virtual machine image of the virtual machine.

11. The apparatus according to claim 10, wherein the path selecting unit is further configured to select at least two routing paths having a shortest response time from the plurality of routing paths if there are not the at least two routing paths that do not pass through the same intermediate routing device in the plurality of routing paths.

12. The apparatus according to claim 10, wherein the path selecting unit is further configured to select at least two routing paths that do not pass through the same intermediate routing device and have a shortest response time from the plurality of routing paths.

13. The apparatus according to claim 10, wherein the selecting module comprises:
- a network segment determining unit configured to determine network segments to which the IP addresses of the plurality of storage nodes belong;
- a location area identifier obtaining unit configured to obtain location area identifiers of the plurality of storage nodes according to a pre-established network segment-location area mapping table; and
- a node determining unit configured to determine at least two storage nodes having different location area identifiers from the plurality of storage nodes storing the same virtual machine image of the virtual machine.

14. The apparatus according to claim 10, further comprising:
- a checking module configured to check, in response to any one of the redundant connections being disconnected, whether there are remaining storage nodes except the determined at least two storage nodes in the plurality of storage nodes storing the same virtual machine image of the virtual machine;
- wherein the determining module is further configured to determine a storage node from the remaining storage nodes;
- the connection establishing module is further configured to establish a connection between the compute node provisioning the virtual machine and the determined storage node.

15. The apparatus according to claim 14, further comprising:
- a copy creating module configured to create a local copy of the virtual machine image on a local disk of the compute node provisioning the virtual machine if there is no remaining storage node in the plurality of storage nodes storing the same virtual machine image of the virtual machine;
- wherein the connection establishing module is further configured to establish a connection to the local copy on the compute node provisioning the virtual machine.

16. The apparatus according to claim 14, wherein the node obtaining module is configured to obtain another compute node storing a local copy of the virtual machine image if there is no remaining storage node in the plurality of storage nodes storing the same virtual machine image of the virtual machine; and
the connection establishing module is further configured to establish a connection between the compute node and the another compute node storing the local copy of the virtual machine image.

17. The apparatus according to claim 10, wherein the node obtaining module is further configured to receive an indication from each of the plurality of storage nodes indicating which virtual machine images are stored thereon.

18. The apparatus according to claim 17, wherein the indication is received in a report provided by the each of the plurality of storage nodes that also includes a respective IP address for each respective one of the plurality of storage nodes storing the same virtual machine image of the virtual machine.

* * * * *